United States Patent [19]
Ammons

[11] 3,716,938
[45] Feb. 20, 1973

[54] SUSPENSION FISH BOX

[76] Inventor: Walter D. Ammons, 11 Little Ocean Club, Stuart, Fla. 33494

[22] Filed: Sept. 20, 1971

[21] Appl. No.: 181,799

[52] U.S. Cl. ..........................43/55, 150/49, 248/99
[51] Int. Cl. ..............................................A01k 97/00
[58] Field of Search ................43/55; 150/49; 248/99

[56] References Cited

UNITED STATES PATENTS

| | | | |
|---|---|---|---|
| 605,343 | 6/1898 | Ross | 43/55 UX |
| 666,296 | 1/1901 | Wiard | 248/99 |
| 1,151,699 | 8/1915 | McBride | 43/55 |
| 1,401,660 | 12/1921 | White | 150/49 X |
| 2,894,708 | 7/1959 | Kaplan | 248/99 |

Primary Examiner—Louis G. Mancene
Assistant Examiner—Daniel J. Leach
Attorney—Ephraim Banning

[57] ABSTRACT

A main tubular frame bent to provide a straight top bar with legs depending from opposite ends thereof, together with a sub-frame of similar configuration hinged to the main frame with means to limit swinging movements therebetween. The two frames support a flexible water-tight sheet fashioned to provide an open-top box depending from the top bars, the sheet being provided with cut-away portions at the bar ends and therebetween to exposed portions of the bars therethrough. Hooks fixedly carried by a fishing yacht, as within its cockpit, when engaged with the top bar under side of the main frame, provide adequate support for the entire box structure at a desired elevation. Its normally open top is then positioned to receive both water and fish, as and when caught, any substantial load being evenly distributed lengthwise of the bar tops. The box contents will remain intact therein until unloaded, whereupon the box may be water-flushed, collapsed, and stowed away to await further usage at a later time.

3 Claims, 5 Drawing Figures

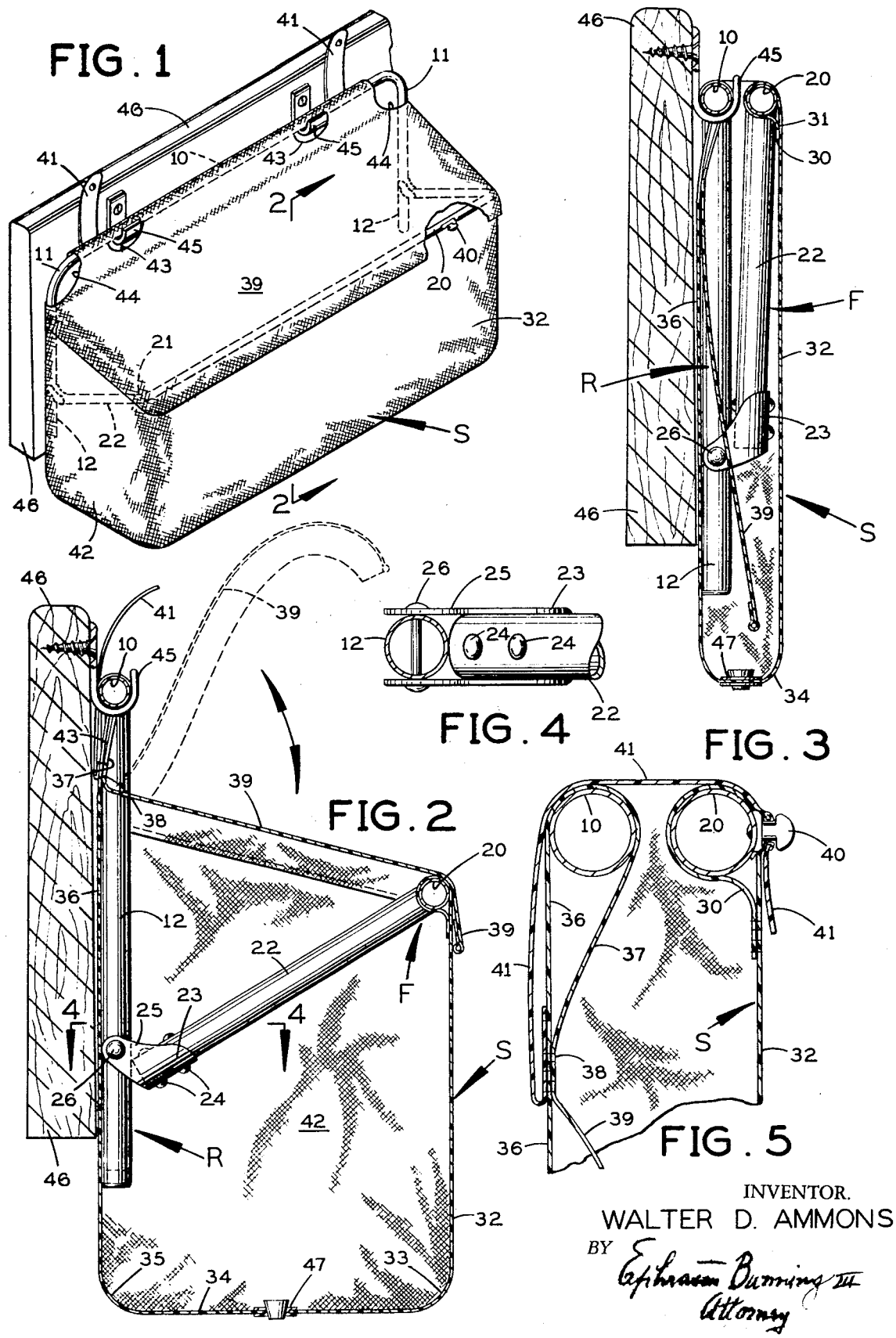

SUSPENSION FISH BOX

This invention is concerned with a collapsible fish box which, in use, is suspended with its top normally wide open or closed, as desired. Sports fishermen, in particular, find it advantageous to equip their yachts with water-tight boxes of ample size to accommodate variable amounts of water along with the expected catch of fish differing in sizes and kinds, but the space available for any such box is not easily found owing, in part, to their usual large size and varying lengths and capacities. The boat's cockpit where much of the fishing is done would be most convenient, but there the space available for any fixed anchorage of the box is at a premium. Disadvantages such as these are overcome by the fish box of this invention which may be opened up for use, then be detachably suspended upon fixed hooks either inboard or outboard of the usual yacht, in any one of several locations suitable for the purpose.

A primary requirement for the suspension fish box of this invention is that it be light, tough, durable and collapsible to occupy a minimum of space when not in use. For this purpose, its strength must be adequate to hold plenty of water and a catch of fish aggregating several hundred pounds in weight, if necessary. It must also be readily producible in variable lengths up to 10 feet or so to accommodate expected fish catches which may be large or small, depending upon the waters to be fished, the skill and number of the fishermen, etc. The box comprises (1) a main tubular frame to which a generally similar sub-frame is hingedly joined in such a way as to engage therewith when opened through the desired distance. Each of these two frames requires in its production no machine operations other than bending of its tubular walls around wide radii at two places to provide spaced parallel legs, then punching one or two holes in the legs to receive pins, screws, or bolts which secure a pair of hinges therebetween. The two frames so joined are then ready to receive and support (2) a flexible heavy sheet of plasticized, rubberized, or other suitable material, fashioned to form an elongated receptacle, open at the top, and provided with a closure flap which serves as a cover when in closed position. The receptacle or box so formed is readily folded while still carried on its two supporting frames, but only when the sub-frame is swung toward the other into a position of collapse. The top bar of the main frame is exposed at desired places to receive on its under side supporting engagement from two or more hooks which are affixed to the boat structure where it is planned to suspend the box, perhaps along one side of its cockpit, or possibly outboard thereof. While the flexible box material may have adequate tensile strength to support a load running sometimes into hundreds of pounds, the load should be transmitted therefrom to be distributed evenly over the two frames to assure a safe suspension mounting therefor, and this is one objective achieved by the present invention.

A preferred embodiment thereof is illustrated in the accompanying drawing wherein:

FIG. 1 is a perspective view of the fish box, as it appears when opened up and suspended ready for use;

FIG. 2 is a vertical section therethrough, taken on line 2—2 of FIG. 1;

FIG. 3 is a similar sectional view, showing the fish box folded, ready for storage;

FIG. 4 is a fragmentary detail of one hinge joint, showing in elevation its position relative to the two frames with which it cooperates; and FIG. 5, which is a sectional view similar to FIG. 2, shows the box closure flap secured to hold the cover in its closed position.

The frame comprises two tubular frames, preferably of aluminum or some alloy thereof, or possibly of a suitable plastic material, interconnected by a pair of like hinge joints whereby a sub-frame F at the front may be swung toward and from a main frame R to the rear thereof. Each frame unit is shown as rounded and tubular in form, bent to provide a top bar with parallel legs depending from opposite ends thereof. In the main frame R the top bar 10 is bent at spaced points 11 through wide-radius curves to provide a pair of legs 12, one at each end. Similarly, the subframe F has a top bar 20 bent through wide-radius curves 21 to provide depending legs 22 at the bar ends. Each interconnecting hinge comprises a saddle plate 23 shaped to embrace one such frame leg 22 at or near its free end and be secured thereto as by locking pins 24 which traverse opposite walls of the leg. Heads may be formed at their opposite ends to hold the pins against axial movement. Extending upwardly and rearwardly from the walls of the saddle plate is a pair of ears 25 adapted to embrace the proximate leg 12 of the main frame through which is extended a hinge pin 26 which is carried between the two ears. A locking head at one or both ends of each pin may be provided. If the hinge pin be formed at one end to receive a cotter or nut, assembly of the two frame units with a flexible sheet S attached thereto will be facilitated. It will be noted that at one point in the swinging movement of the sub-frame, where its position is more nearly horizontal than vertical, the ends of its legs 22 will engage the front sides of the legs 12 of the main frame, thereby to limit their relative movements. A substantial thrust force is then transmitted through the legs 22 to be delivered to the legs 12 of the main frame whereby to maintain the sub-frame in its open position. This point of engagement is below the axis of the hinge pin 26 whose mechanical function is largely to support the legs 22 of the sub-frame F in this engaging position. The sub-frame legs are then inclined slightly downwardly toward the rear. The range of this swinging movement for the sub-frame is desirably about 70° or more.

The two frames of this description serve as a mounting for a strong flexible sheet S of plasticized or other suitable material adapted to be fashioned into a collapsible box or receptacle. As shown in FIG. 1, such a sheet may start at the sub-frame top bar 20 over and around which it is looped with its free end portion 30 affixed thereto along a line 31 therebelow, as by stitching, cement, or otherwise. Within the elongated pocket thus formed, the bar 20 is confined. Depending from this bar the sheet provides a front wall 32, then proceeds at its lowest level through a curve 33 to form a bottom 34 for the box. A second curve 35 is also provided in the bottom where it rises to provide a back or rear wall 36 which, at a point of maximum elevation, is looped over and around the top bar 10 of the main frame to be suspended therefrom. After looping over this top bar, the sheet S extends downwardly along its front to provide a head wall 37 which is linearly secured to the rear wall 36 along a line 38, as by stitching, cement, or otherwise. Between the top bar 10 and the linear connecting line 38, the back and head walls 36 and 37 cooperate to form an elongated pocket, open at opposite ends, wherein the top bar 10 of the main frame remains confined.

Continuing on downwardly and forwardly from the connecting line 38 to and over the top bar 20 of the sub-frame F, the sheet provides therebetween a closure flap 39 adapted to overlie the box and its contents. The free edge portions of this closure flap then depend beyond the front and end walls 32 and 42 for a relatively short distance where they may be secured detachably with the aid of one or more fasteners such as turn buttons 40. To remain open and away from the top of the box, the closure flap may be rolled or folded back against the head wall 37 where web straps 41, secured at one end to the rear wall 36, may be extended forwardly to overlie the closure flap and engage with any appropriate fastener carried thereby to hold it in its retracted position.

The single sheet S which forms the four walls and bottom of the box is supplemented by two rectangular pieces to provide the end walls 42 therefor. Stitching, cement, or other suitable means may be employed to secure the edge portions of the end walls to the proximate edges of the sheet S in a water-tight manner. The width of these end walls is ample to permit full opening movement of the two frames, limited mainly, if not entirely, by their interengagement close to the hinge joint therebetween. The top edges of the end walls are inclined downwardly toward the front wall the same as the closure flap 39 for the box. When the box is fully opened, any load therewithin is sustained by its vertical walls which are depended from the top bars of the two frames. The foldable walls of the box will then be distended outwardly as required for accommodation of the box contents. The load is evenly distributed along the top bars 10 and 20 for their entire lengths. This load may be considerable, resulting from the water and fish within the box. This load also exerts a substantial downpull, particularly on the front wall which is sustained in its vertical position by the legs 22 when engaged with those of the rear frame to transmit thrust forces thereto. The front legs 22 are then serving as struts to pressure-engage the rear legs 12, whereby to sustain the box structure firmly and immovably when in use.

Suspension of the fish box at a desired elevation is also facilitated by providing two or more spaced registering cut-outs 43 in the back and head walls forming the pocket wherein the top bar 10 of the main frame is confined. The margins of these cut-outs may be reinforced, in any desired way, if needed. As shown, the shape of each cut-out may be semicircular just below the top bar 10 whereby to expose a considerable portion of its under side. At points opposite the frame corners 11, recesses 44 are provided through which the frame corners may protrude, thereby to avoid pressurizing of the sheet locally at these points. Two or more strap hooks 45 affixed to one cockpit wall, such as its coaming 46, are fixedly positioned to extend through the cut-outs 43 of the two pocket walls of the box to underlie the top bar 10 whereby to supportingly engage directly therewith. The load within the box is then carried by its several walls along the top walls of the two frames to sustain the box, with its contents intact, at the elevation provided for its suspension by the supporting hooks.

A drain fitting 47 provided with a removable plug, may be applied to the box bottom to facilitate draining of the water from within the box whenever its liquid contents are to be emptied. The handling of fish, at best, is a messy operation, so that a clean-up of the cockpit area is greatly simplified by use of the present collapsible box. The box need only be removed from its supporting hooks, then flushed out with water along with the surrounding area of the boat, preliminary to collapsing of the box and stowing of it away in any convenient place.

I claim:

1. A suspension fish box comprising (a) a main tubular frame having a horizontal top bar bent to provide at opposite ends a pair of depending legs, (b) a sub-frame of similar structure and configuration having legs hingedly mounted at their free ends to the legs of the main frame at an elevation which permits the sub-frame to swing between closed and open positions relative to the main frame in the former of which the top bar and legs of the sub-frame lie adjacent those of the main frame and parallel therewith and in the latter of which the top bar of the sub-frame is swung outwardly and downwardly away from the top bar of the main frame with its two legs inclined outwardly and upwardly from their hinged mountings to a position approaching the horizontal, thereby to support the sub-frame when so positioned, and (c) a flexible foldable water-tight sheet fashioned into an open-top box having a front, bottom and back walls with a cover flap for the open top thereof, together with (d) end walls extending between the box walls and in water-tight connection therewith, the upper end portions of the front and back walls being looped over and around the top bars of the main and sub-frames to provide thereat double plies each linearly secured therebelow to its own wall to provide elongated pockets wherein the proximate top bar may be confined, the double plies of the back wall being cut away at spaced points lengthwise thereof to expose the frame top bar therewithin whereby it may be supportingly positioned directly upon fixed hook means in underlying relation thereto when the fish box is to be suspended in operative position to receive its intended load.

2. A suspension fish box, as specified in claim 1, wherein the means for hingedly mounting the legs of the sub-frame to those of the main frame comprise, in each instance, a plate fixedly connected to one of them and hingedly joined to the other in alignment therewith whereby to provide for swinging movements therebetween through a fixed path between two positions, one of which approaches the horizontal whereby the sub-frame legs at their free ends are also pressure-engaged with the proximate sides of the main frame to transmit directly thereto through a plane substantially transversely thereof a thrust force originating with the load within the fish box.

3. A suspension fish box, as specified in claim 1, wherein the upper end portion of the back wall, where it depends from the top bar of the main frame, provides a head wall disposed approximately vertically and at an elevation above the cover flap, and flexible means affixed to the back wall and extensible forwardly over the top bar of the main frame to releasably connect with the cover flap, when folded upon itself to rest against the head wall, whereby to maintain the cover flap in open position relative to the fish box.

* * * * *